(No Model.)

R. G. PETERS.
CIRCULAR SAWING MACHINE.

No. 306,949. Patented Oct. 21, 1884.

Witnesses
N. A. Clark
Jno. C. Schroeder

Inventor
Richard G Peters
by Geo W Dyer,
Atty (No Model.) 2 Sheets—Sheet 2.

R. G. PETERS.
CIRCULAR SAWING MACHINE.

No. 306,949. Patented Oct. 21, 1884.

Witnesses
N. A. Clark,
Jno. C. Schroeder

Inventor
Richard G. Peters
by Geo. W. Dyer,
atty

United States Patent Office.

RICHARD G. PETERS, OF MANISTEE, MICHIGAN.

CIRCULAR SAWING MACHINE.

SPECIFICATION forming part of Letters Patent No. 306,949, dated October 21, 1884.

Application filed December 1, 1883. (No model.)

*To all whom it may concern:*

Be it known that I, RICHARD G. PETERS, of Manistee, in the county of Manistee and State of Michigan, have invented a new and useful Improvement in Machines for Cutting Sidings and Floorings in Strips; and I do hereby declare that the following is a full and exact description of the same, reference being had to the accompanying drawings, and to the letters of reference marked thereon.

My invention relates to machines for cutting sidings and floorings in strips; and its object is to so construct such a machine that the work will be done in the simplest, cheapest, and most effective manner.

To the accomplishment of the above the invention consists, first, of the use of a vertical saw and two horizontal saws, and of their novel arrangement in respect to each other; second, of the novel arrangement on the machine of the vertical saw, and of the novel means of adjustment employed in connection therewith; third, of the novel arrangement on the machine of the two horizontal saws, and of the novel means of adjustment employed in connection therewith; fourth, of the novel means employed to adjust the log-supporting mechanism, and, fifth, of novel means for determining the position of the log in respect to the saws.

For the better understanding of my invention, and in order that those skilled in the art may know how to make and use the same, reference is herewith made to the accompanying sheets of drawings, which form part of this specification, and in which—

Figure 1:
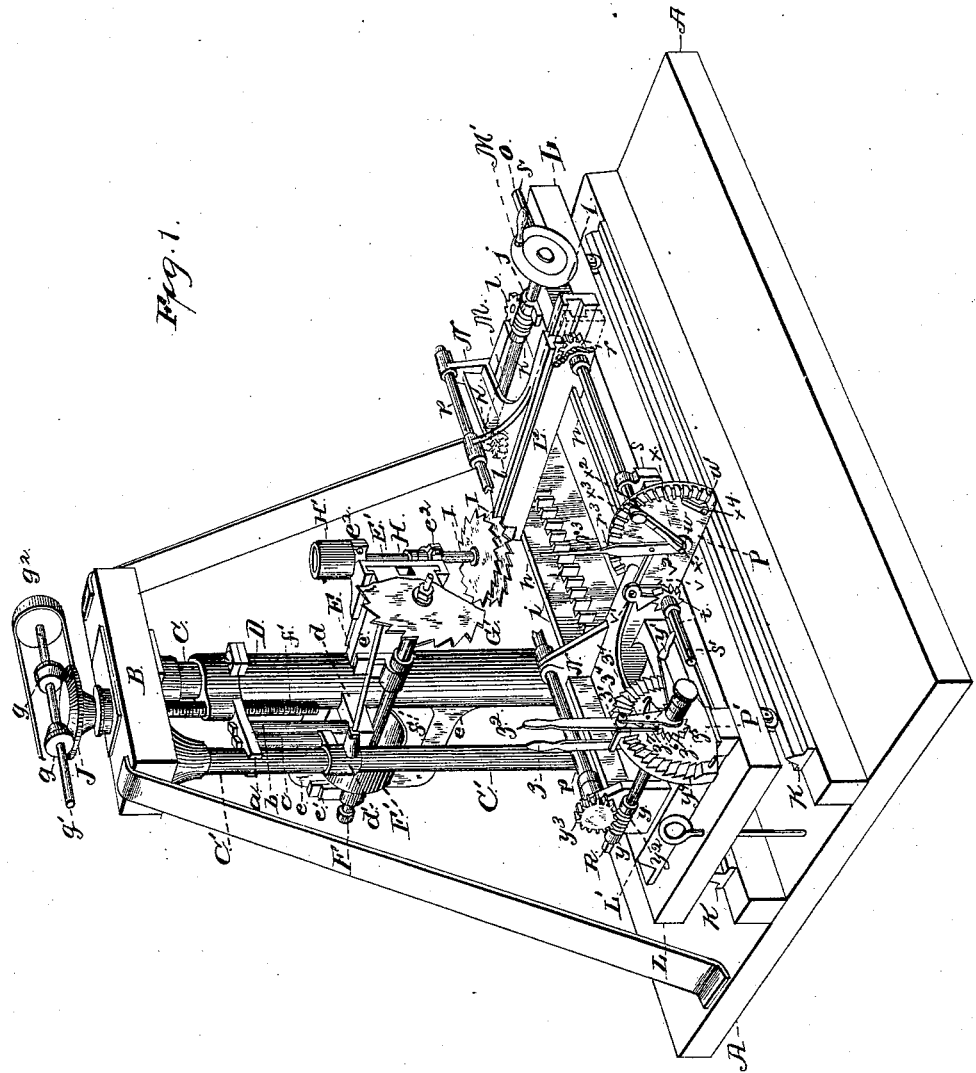
Figure 2:
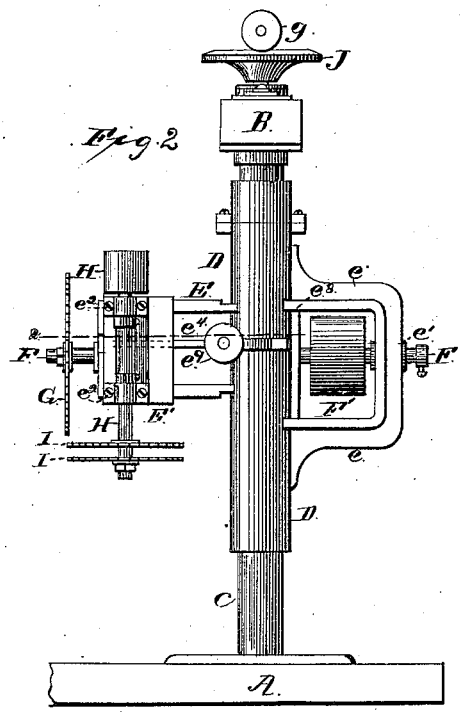
Figure 3:
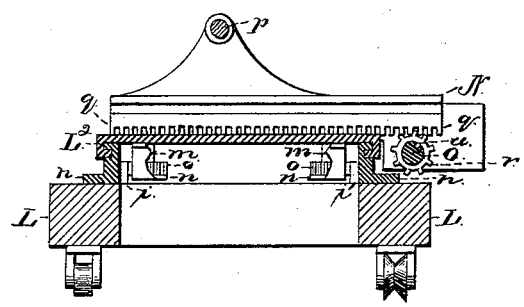
Figure 4:
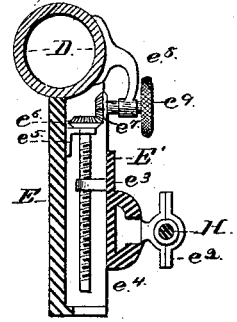

Figure 1 is a perspective view, with parts broken away, of a machine embodying my improvements; Fig. 2, a side elevation of that portion which supports the saws; Fig. 3, a section on the line 1 of Fig. 1, and Fig. 4 a section on the line 2 of Fig. 2.

Like letters refer to corresponding parts in the several views.

In the drawings, A represents the floor of the mill, B a beam of the same, and C C' two uprights or supports.

Around the upright C is passed a sleeve, D, which moves up and down upon said upright as a guide. At or near its upper end this sleeve D is provided with an outwardly-extending arm, $a$, which is curved upon its outer end and presses against the upright C', as shown. Extending downwardly from this arm $a$ are two rods, $b$ and $c$, the one $b$ having its lower end secured to a projecting arm, $d$, formed lower down on sleeve D, and the one $c$ being secured at its lower end to a ring, $d'$, which encircles the upright C' and moves thereon.

By means of the construction thus far described the sleeve D, in being raised or lowered, is always even in its movement. The sleeve D is also provided at the points shown with bracket $e$ and guideway E, to each of which are secured suitable journal-boxes, $e'$, in which a shaft, F, has its bearings. This shaft is provided with a pulley, F', around which a suitable driving-belt is passed, said belt serving to connect the machine herein described with any suitable machinery to impart motion to shaft F. Upon the opposite end of shaft F a vertical circular saw, G, is secured, this saw being used to cut the "sidings," as will be described.

Mounted upon the guideway E, and moving on suitable flanges provided on the top and bottom thereof, is a plate, E', movable horizontally, said plate being provided with suitable journal-boxes, $e^2$, in which is mounted a vertical shaft, H, carrying on its lower end the two horizontal saws I I. The shaft H is also provided on its upper end with a pulley, H', over which is passed a suitable driving-belt to impart motion to said shaft and to the saws secured to the lower end thereof.

The mechanism employed to obtain the horizontal adjustment of shaft H and saws I is as follows:

To the inner face of plate E' is secured a projection, $e^3$, provided with screw-threaded hole, through which is passed a screw-threaded rod, $e^4$, said rod having bearing or support at its opposite end in a bracket, $e^5$, secured to inner face of guideway E. Upon its end this rod $e^4$ is provided with a ratchet-wheel, $e^6$, which meshes with a similar wheel, $e^7$, mounted upon the end of another shaft and at right angles to the wheel $e^6$. The shaft to which wheel $e^7$ is secured is mounted in a bracket, $e^8$, secured to sleeve D, and has secured to its outer end a thumb-nut, $e^9$, by means of which said shaft is operated. When horizontal adjustment of saws I is desired, the thumb-nut $e^9$ is turned in the desired direction, and plate E' is moved along guideway E by means of screw-threaded rod $e^4$, and in its movement the plate E' carries to the position desired the shaft H and saws I, secured to the lower end thereof. A brace or stay, $f$, connects guideway E to ring $d'$, previously described as passing around upright C, to render the movement of these parts even.

The mechanism employed for adjusting the saw G is as follows:

A vertical screw-threaded rod, $f'$, has its bearing in the arm $a$ and beam B. On the upper end of this rod, and secured to it, is a large bevel friction-wheel, J, which is rotated by frictional contact with two bevel-wheels, $g\ g$, mounted upon a shaft, $g'$, and rotated by a pulley, $g^2$, around which a suitable driving-belt is passed.

Upon the floor A are placed, as shown, tracks K K, upon which a truck or carriage, L, moves, said truck or carriage being provided with mechanism for holding the log to be acted upon by saws, also means for revolving said logs, and means for adjusting said logs both longitudinally and transversely, all of which will now be described.

On the top of truck or carriage L, and at one end thereof, is secured a fixed carriage, L'.

To the right of the fixed carriage L', as shown in drawings, are two rails or guideways, $h\ h$, along which a carriage, L², moves. Each of these rails has formed on its inner face a series of ratchet-teeth, $i$, the object of which will be described.

Extending transversely across the carriage L² is a shaft, M, mounted in suitable journal-boxes, $j\ j$. This shaft is provided on one end with a suitable hand-wheel, M', by means of which it is revolved, and at the points shown in Fig. 1 with spiral screw-threads $k\ k$, with each of which a ratchet-wheel, $l$, meshes. These ratchet-wheels $l$ are each mounted upon the upper end of a vertical shaft, $m$, which have bearings in the upper face of carriage L², and in hangers or brackets $n$, suspended beneath said carriage. Upon the lower end of each shaft $m$ is a second ratchet-wheel, $o$, which in their revolution mesh with teeth $i$, formed on rails $h$.

By means of the mechanism described in this connection it will be readily understood that, upon the revolution of the shaft M, the ratchet-wheels $l$ are caused to revolve by spiral threads $k$, and with said wheels the wheels $o$, mounted upon the lower end of shafts $m$, which action causes said wheels $o$ to mesh with teeth $i$ on rails $h$, and to move the carriage L² longitudinally on said rails.

Mounted upon each of the carriages L' and L², and capable of transverse adjustment thereon, is a head-block, N, each of which supports in brackets on its upper face a center, $p$, between which the log is suspended. These head-blocks move in suitable guideways formed on carriages L' and L², and are provided on the bottom of their inner ends each with a series of ratchet-teeth, $q\ q$, which teeth mesh with ratchet-wheels $r\ r$, mounted upon a rod or shaft, O, now to be referred to. This shaft has bearings, as shown, in extensions of carriages L' and L², and in brackets $s\ s$, secured to one side of truck or carriage L. It is provided throughout its entire length with a slot, $s'$, and has secured to it, at the points shown, ratchet-wheels $r\ r$ and $t$, said wheels being secured to said shaft by means of ridges or projections $u$, with which each is provided on its inner circumference, these ridges entering the slot $s'$ in shaft O and causing said shaft to revolve with the wheels. The wheels $r\ r$, as before mentioned, are employed to obtain the transverse adjustment of head-blocks N, and the one $t$, when acted upon by the pawl-and-lever mechanism now to be described, serves to operate the shaft O.

Mounted loosely upon the shaft O, and adjacent to one side of the ratchet wheel $t$, is an arm, $v$, having pivoted to one side, near its upper end, a pawl, $v'$. At a point opposite, upon the other side of this arm $v$, is pivoted one end of a lever, $v^2$, the other end of said lever connecting loosely with a hand-lever, $v^3$. This lever $v^3$ is loosely mounted at its lower end upon a stud, $w$, located at the center of a circle of which the plate P is a quadrant. This plate is secured to the fixed carriage L' at a right angle to the shaft O, and is provided, as shown, with a series of teeth, $w'$.

Mounted upon the stud $w$ is an arm, $x$, provided near its lower end with a leaf-spring, $x'$, by means of which the upper end of said arm is constantly pressed against the plate P. Upon its upper end the arm $x$ is provided with a pin or point, $x^2$, which enters the teeth $w'$ of plate P, and also with a knob, $x^3$, by means of which pin $x^2$ is withdrawn from said teeth.

Secured to plate P at the point shown is a stop, $x^4$, which limits the movement of arm $x$. When the rod O has been operated by lever $v^3$, and the head-blocks N moved to the positions desired, the arm $x$ is carried to a position directly behind said lever, and serves to hold it in position.

Secured to one corner of carriage L, and in the same line with the shaft O, is a plate, P', similar in construction to the one P, before referred to, but having a greater circumference. A rod, R, has bearings in this plate and in brackets $y\ y$, secured to head-block N, mounted upon fixed carriage L'. This rod is provided on its outer end with a crank, $y'$, by means of which it is revolved, and at a point near its opposite end with a spiral screw-thread, $y^2$, which, upon the revolution of rod R, meshes with a cog-wheel, $y^3$, mounted upon the end of center $p$. Through the medium of these parts the log which is suspended between the center $p$, mounted on head-block N, and a similar center mounted on the opposite head-block, is revolved.

Mounted upon the rod R is an upwardly-projecting arm, $z$, which is provided at a point near its upper end with an L-shaped arm, $z'$, which passes over the upper edge of plate P', and when operated upon by other parts, now to be described, engages with teeth $y^4$, with which said plate is provided.

Secured to rod R, near its outer end, are two arms, $z^2$ and $z^3$, the one $z^2$ extending a short distance above the top of plate P' and connected to the one $z^3$ by means of a bolt, $z^4$.

Mounted upon the rod R, and at a point between the arms $z^2$ and $z^3$, is a ratchet-wheel, $z^5$, with which a pawl, $z^6$, engages, said pawl being suspended above this wheel between the arms $z^2$ and $z^3$. Suspended between these arms, and at a point directly above the pawl $z^6$, is a spring, $z^7$, which presses down on pawl $z^6$, and causes it to perform its work. The bolt $z^4$, which connects arms $z^2$ and $z^3$, extends a short distance beyond arm $z^2$, and forms a stud which impinges against the L-shaped arm $z'$ and forces it to engage with teeth $z^4$ on plate P'. When the log has been revolved and caused to occupy the desired position, these parts are placed as shown in Fig. 1, and the further revolution of the log prevented.

Having thus fully described the several parts of my invention, what I claim as new therein, and that for which I desire to secure Letters Patent, is—

1. In a machine of substantially the character described, the combination of a vertically-adjustable vertical saw, a pair of laterally and vertically adjustable horizontal saws, and two carriages mounted upon a truck, one of said carriages being longitudinally adjustable toward or away from the other, substantially as described.

2. In a machine of substantially the character described, the combination of a vertically-adjustable vertical saw, a pair of laterally and vertically adjustable horizontal saws, two carriages, one adjustable longitudinally toward or away from the other, and laterally-adjustable head-blocks mounted upon said carriages, and carrying log-supporting centers adapted to be revolved and adjusted, substantially as and for the purpose set forth.

3. A machine of substantially the character described, having an upright, C, provided with a sleeve, D, supporting a vertical and a pair of horizontal saws, adapted to vertical adjustment by a screw connecting with said sleeve and suitable gearing, substantially as described.

4. In a machine of substantially the character described, an upright, C, having a vertically-adjustable sleeve, D, provided with an extension, E, supporting a pair of horizontal saws, and having means whereby the said saws may be laterally adjusted upon said extension, substantially as described.

5. In a machine of substantially the character described, an upright, C, having an adjustable sleeve supporting a vertical and a pair of horizontal saws, in combination with a second upright, C', and intermediate connections for guiding and strengthening the adjustable sleeve, substantially as described.

6. In a machine of substantially the character described, the combination, with the carriage L' and its head-block mounted on a truck, of the movable carriage $L^2$ and its head-block mounted on said truck, and adapted to longitudinal adjustment toward or away from the former by means of a screw-shaft meshing with pinions arranged opposite upon said carriage, and in turn operating pinions meshing with stationary racks supporting said carriage and arranged parallel upon opposite sides of the truck, substantially as described.

7. In a machine of substantially the character described, the combination, with the stationary and adjustable carriages, of head-blocks carrying log-supporting centers, and provided each with a rack engaging with a pinion keyed to a grooved shaft operated by a ratchet, pawl, and lever mechanism, substantially as described.

8. In a machine of substantially the character described, the combination, with one of the log-supporting centers, of a screw-shaft mounted upon one end of its head-block and engaging with and operating a pinion on one end of said center, substantially as and for the purpose set forth.

9. In a machine of substantially the character described, the combination, with the screw-shaft for revolving one of the log-supporting centers, of means for locking said shaft, consisting of a plate mounted upon one end of the head-block and supporting the outer end of said shaft, a lever mounted upon said shaft on one side of the plate and adapted to engage with teeth on the circumference of the latter, and a pair of levers mounted upon said shaft upon the opposite side of the plate, with an intermediate ratchet and a spring-pawl, substantially as and for the purpose set forth.

In testimony whereof I affix my signature in presence of two witnesses.

RICHARD G. PETERS.

Witnesses:
ALPHEUS G. SMITH,
HENRY W. CAREY.